United States Patent [19]

Elliott, Jr.

[11] 3,933,983

[45] *Jan. 20, 1976

[54] METHOD OF INCREASING THE THERMAL STABILITY OF CRYSTALLINE ZEOLITES

[75] Inventor: Curtis H. Elliott, Jr., Baltimore, Md.

[73] Assignee: W. R. Grace & Co., New York, N.Y.

[ * ] Notice: The portion of the term of this patent subsequent to July 20, 1988, has been disclaimed.

[22] Filed: Nov. 12, 1973

[21] Appl. No.: 415,861

Related U.S. Application Data

[63] Continuation of Ser. No. 150,780, June 7, 1971, abandoned, which is a continuation-in-part of Ser. No. 803,117, Feb. 27, 1969, Pat. No. 3,594,331.

[52] U.S. Cl............... 423/328; 252/442; 252/445 Z
[51] Int. Cl.$^2$......................................... C01B 33/28
[58] Field of Search .......... 423/328, 329, 330, 112, 423/118; 252/441, 442, 455 Z

[56] References Cited
UNITED STATES PATENTS

| 3,402,996 | 9/1968 | Maher et al. ...................... 423/228 |
|---|---|---|
| 3,575,887 | 4/1971 | Wilson ............................... 252/442 |
| 3,594,331 | 7/1971 | Elliott ............................... 252/442 |
| 3,619,412 | 11/1971 | Clement........................... 252/442 X |
| 3,630,965 | 12/1971 | Voorhies et al. ................... 252/442 |

Primary Examiner—Edward J. Meros
Attorney, Agent, or Firm—Michael J. McGreal

[57] ABSTRACT

Methods of increasing the thermal stability of crystalline zeolites are disclosed. The methods are characterized by the steps of either (i), treating the crystalline zeolite first in at least one step with a dilute solution of a fluorine compound whereby a very small amount of fluoride is incorporated in the zeolite with a subsequent exchange with an ammonium ion, rare earth ion, or other metal ion solution, (ii), first exchanging the zeolite with an ammonium ion, rare earth ion or other metal ion solution followed by a treating with a dilute fluoride solution, or (iii), concurrently treating the zeolite with the fluoride ion and exchanging the zeolite in a simultaneous operation.

15 Claims, No Drawings

METHOD OF INCREASING THE THERMAL STABILITY OF CRYSTALLINE ZEOLITES

This is a continuation of application Ser. No. 150,780 filed June 7, 1971, now abandoned which in turn is a continuation-in-part application of Ser. No. 803,117 filed Feb. 27, 1969, now Pat. No. 3,544,331.

This invention relates to methods of increasing the thermal stability of crystalline zeolites. In one aspect, the invention relates to methods of increasing the thermal stability of crystalline zeolites such as for example those characterized as Type A, Type Y and Type X. In a further aspect, the invention relates to a method of either (i), treating crystalline zeolites with a solution of soluble fluorine compound followed by an exchange with an ammonium ion, rare earth ion or other metal ion solution, or (ii), an exchange with an ammonium ion, rare earth ion or other metal ion solution followed by a treatment with a fluoride ion, or (iii), a concurrent treating of the zeolite with a fluoride ion solution and exchanging with a compatible ammonium ion, rare earth ion or other metal solution.

Molecular sieves are crystalline metal aluminosilicates having a three-dimensional interconnecting network structure of silica and alumina tetrahedra. The tetrahedra are formed by four oxygen atoms surrounding a silicon or aluminum atom. This structure permits a neat chain arrangement of building tetrahedra uniformly in four directions. Since oxygen atoms have two negative charges, while the silicon atoms have four positive charges and the aluminum atoms have three positive charges, the trivalency of the alumina causes the alumina tetrahedra to be negatively charged, thus requiring an additional positive charge to balance the system. In the usual synthesized form, this charge is usually supplied by a sodium or potassium cation, most frequently a sodium cation. These charge balancing cations are exchangeable ions and can be exchanged with other cations.

Also, up to half the quadravalent silicon atoms in the zeolite crystal structure can be replaced by trivalent alumina atoms. Thus, by regulating the ratios of the starting materials used to prepare the zeolites, it is possible to produce zeolites containing different ratios of silica:alumina having essentially the same crystal structure and as well as zeolites having different structures.

The crystalline zeolites, particularly those designated as Types A, X and Y, have become widely acclaimed for their value as selective adsorbents and catalysts. The ability to selectively adsorb molecules based on their kinetic molecular size, diameter and polarity is attributed to their unique crystal structure which affords a series of uniformly sized pore openings which permit molecules having smaller kinetic molecular diameters than the pore opening to pass into the interior of the zeolite while excluding larger molecules.

For example, in the crystalline zeolite designated as Type A, the tetrahedral are grouped to form a truncated octahedron with a silica or alumina tetrahedron at each point. This structure is known as a sodalite cage, which in itself contains a small cavity which is of no practical significance since the largest openings are not large enough to permit even the entrance of the smallest molecules. However, when the sodalite cages are stacked in simple cubic forms, as they are in the Type A zeolite, the result is a network of cavities approximately 11.5 A in diameter, which is accessible through openings on all six sides. These openings are surrounded by eight oxygen ions and are partially blocked by the exchangeable charge balancing in the cation. Thus, by substituting different cations for the balancing cations, zeolites of different pore size openings and therefore selectivity, can be obtained. In the usual synthesized sodium cation Type A zeolite, the oxygen atom rings provide openings of about 4.2 A in diameter. By exchanging the sodium cation, or preparing the zeolite with potassuim ions, the pore opening will be reduced to 3 A. Similarly, by ion exchanging the sodium ion with a divalent cation, the pore opening can be increased (e.g., the calcium form Type A has a pore opening of about 5 A in diameter) since only half as many cations will be required to balance the negative charge.

The crystalline zeolites are formed with a large amount of water of hydration which fills the cavities. Fortunately, this water of hydration is loosely bound and can be easily removed by moderate heating. The zeolite is then free to adsorb molecules of the correct kinetic molecular diameter and polarity into these cavities.

Another zeolite which has become of particular interest to the art is referred to as faujasite. This encompasses the zeolites designated Type X and Y. These zeolites have a crystalline structure similar to that of Type A in that they also are made up of the basic sodalite building blocks. However, in this case, the sodalite cages are arranged in a tetrahedron relationship (diamond structure) with bridging across the six membered hexagonal rings, thereby forming a twelve membered oxygen atom ring. These rings provide pore openings of about 9–10 A in diameter. As with the Type A structure, the overall electrical charge is balanced by a positively charged exchangeable cation. The faujasite zeolites, as well as being a very desirable selective adsorbent, are also highly regarded by the art for their catalytic activity, especially with regard to the promotion of reactions used in upgrading petroleum hydrocarbons. The zeolites designated Types A, X and Y are also referred to by the prior art, as Z-12, Z-14 and Z-14 HS respectively.

Unfortunately, the crystal structures of many of the zeolites do not have sufficient thermal stability to withstand the regeneration temperatures typically used in many adsorption and catalyst systems. This thermal instability is especially acute in the zeolites having lower silica-alumina ratios such as, for example, Types A and X, and represents a substantial problem even in those zeolites having a higher silica-alumina ratio such as, for example, Type Y. The prior art is replete with various methods which propose to solve or alleviate this thermal unstability; some which are more successful than others. One particularly successful method of increasing the thermal stability of the Type Y zeolite is disclosed in U.S. Pat. No. 3,293,192. While the process disclosed in this patent produces an unusually stable product, it requires accurate control and a number of exchange steps and at least one high temperature calcination step. In many cases, the product produced by this process possesses a thermal stability greater than is required, especially where the zeolite is to be used as an adsorbent and thus will not encounter the high temperatures required in coke removal catalyst regeneration cycles. Applicant has, therefore, discovered a simple and inexpensive process for increasing the thermal stability of crystalline zeolites in general, and which notably affords the low silica-alumina ratio zeolites, such as for example, Types A and X, greatly increased thermal stability in the intermediate temperature ranges of about 1200°–1425°F. Thus, the applicant's invention substantially increase both the life of these zeolites and the range of processes in which they can be used.

It is, therefore, an object of the invention to provide a method of increasing the thermal stability of crystalline zeolites, and especially those zeolites having low silica to alumina ratios. It is a further object of the invention to provide zeolite compositions of matter having increased thermal stability.

It is an additional object of this invention to set out a process of first treating a zeolite with a dilute fluoride solution, followed by exchanging with an ammonium ion, rare earth ion or other metal ion solution.

It is further an object of this invention to provide a process of first exchanging a zeolite with an ammonium ion, rare earth ion solution or other metal ion solution followed by a treating with a dilute fluoride ion solution.

It is a still further object of the invention to provide a method of treating crystalline zeolites with a dilute solution of a fluoride compound with a concurrent exchange with an ammonium ion, rare earth ion or other metal ion solution.

Other additional objects will become apparent and in part obvious from the following description and the appended claims.

In summary, the method of my invention comprises treating a crystalline zeolite at least once with a dilute solution, typically an aqueous solution of a fluorine compound in a sufficient quantity to provide about 2 to 22 grams of available fluoride per 10,000 grams of zeolite (dry dehydrated basis). One method of my invention comprises first treating a zeolite with a dilute fluoride solution followed by at least one contacting with an ammonium ion, a rare earth ion or other metal ion solution. There may also be intermediate heat treating steps. Another method of my invention comprises first exchanging the zeolite with an ammonium ion, rare earth ion or other metal ion solution followed by a treatment with a dilute fluoride solution. A further method of my invention comprises at least once a concurrent treating or contacting of a zeolite with a dilute solution mixture, typically an aqueous solution mixture, of a fluorine compound in a sufficient quantity to provide from about 2 to 22 grams of available fluoride per 10,000 grams of zeolite, in a compatible admixture with ammonium or metal compound soluble in this solution, the metal ion in the metal compound, however, not being interactive with the available fluoride ions. This contacting may be followed by further contacting steps, with or without intervening heat treating steps. Heat treating steps help to unlock the sodium ions in the zeolite matrix so that they may be more readily exchanged with the metal ions in solution. The pH of the fluoride solution should be within the range of about 6 to 11 Type X zeolite, as pH's below about 6 can attack the zeolite. For the other zeolites, such as Type Y, the pH may range lower. The temperature of the fluoride solution normally should be within the range of 60° to 130°F, however both higher and lower temperatures can be used within, of course, the freezing and boiling limits of the solution. Virtually any soluble fluorine salt can be used as the source of fluoride, the only limitation being that the salt will dissolve to yield some amount of available fluoride ions. Suitable fluorine compounds which can be used include ammonium fluosilicate, fluosilicic acid, sodium fluosilicate, ammonium fluoride, sodium fluoride, potassium fluosilicate, potassium fluoride and the like. The method of ion exchanging the zeolite may be by any of the known and practiced techniques.

The method of preparing the crystalline zeolite is not a part of my invention, and such methods can be found in the prior art. Suitable crystalline zeolites which may be stabilized according to my invention are listed in the following Table, including their respective chemical compositions and patent references disclosing typical methods of preparing such zeolites.

Table A

| Zeolite | Oxide Mole Ratios (shown as alkali metal oxide form) | Patent Disclosures |
| --- | --- | --- |
| Zeolite X | $1.0\pm0.2Na_2O:Al_2O_3:2.5\pm0.5SiO_2:0-8H_2O$ | U.S.2,882,244 |
| Zeolite Y | $0.9\pm0.2Na_2O:Al_2O_3:3-6SiO_2:0-9H_2O$ | U.S.3,130,007 |
| Zeolite A | $1.0\pm0.2Na_2O:Al_2O_3:1.85\pm0.5SiO_2: 0-6H_2O$ | U.S.2,882,243 |
| Zeolite L | $1.0\pm0.1Na_2O:Al_2O_3: 6.4\pm0.5SiO_2: 0-7H_2O$ | Bel.575,117 |
| Zeolite D | $0.9\pm0.2[(0-1)Na_2O:(1-0)K_2O]:Al_2O_3: 4.5-4.9SiO_2:0-7H_2O$ | Can.611,981 |
| Zeolite R | $0.9\pm0.2Na_2O:Al_2O_3:2.45-3:65SiO_2:0-7H_2O$ | U.S.3,030,181 |
| Zeolite S | $0.9\pm0.2Na_2O:Al_2O_3:4.6-5.9SiO_2:0-7H_2O$ | U.S.3,054,657 |
| Zeolite T | $1.1\pm0.4[(0.1-0.8)Na_2O:(0.9-0.2)K_2O]: Al_2O_3:6.9\pm0.5SiO_2:0-8H_2O$ | U.S.2,950,952 |
| Zeolite Z | $K_2O:Al_2O_3:2SiO_2:0-3H_2O$ | Can.614,995 |
| Zeolite E | $0.9\pm0.1Na_2O:Al_2O_3:1.95\pm0.1SiO_2:0-4H_2O$ | Can.636,931 |
| Zeolite F | $0.95\pm0.15Na_2O:Al_2O_3:2.05\pm0.3SiO_2: 0-3H_2O$ | U.S.2,996,358 |
| Zeolite O | $0.95\pm0.05Na_2O:Al_2O_3:12.2\pm0.05SiO_2: 0-5H_2O$ | U.S.3,140,252 |
| Zeolite B | $1.0\pm0.2Na_2O:Al_2O_3:3.5\pm1.5SiO_2: 0-6H_2O$ | U.S.3,008,803 |
| Zeolite Q | $0.95\pm0.05Na_2O:Al_2O_3:2.2\pm0.05SiO_2: XH_2O$ | U.S.2,991,151 |
| Zeolite M | $1.0\pm0.1K_2O:Al_2O_3:2.0\pm0.1SiO_2: XH_2O$ | U.S.2,995,423 |
| Zeolite H | $1.0\pm0.1Na_2O:Al_2O_3:2.0\pm0.1SiO_2: XH_2O$ | U.S.3,010,789 |
| Zeolite J | $0.9\pm0.1K_2O:Al_2O_3:2.1\pm0.2SiO_2: XH_2O$ | U.S.3,011,869 |
| Zeolite W | $1.0\pm0.1Na_2O:Al_2O_3:4.1\pm0.8SiO_2: YH_2O$ | U.S.3,012,853 |
| Zeolite KG | $0.9-1.1Na_2O:Al_2O_3:2.3-4.2SiO_2:2.6-4.6H_2O$ | U.S.3,056,654 |

My invention process can also be used to stabilize naturally occurring zeolites such as, for example, levynite, dachiardite, erionite, faujasite, analcite, paulingite, noselite, ferriorite, heulandite, scolecite, stilbite, clinoptilolite, harmotome, phillipsite, brewsterite, flakite, datolite and alumino-silicates represented as follows:

Chabazite, $Na_2O.Al_2O_3.4\ SiO_2.6\ H_2O$;
Gmelinite, $Na_2O.Al_2O_3.4\ SiO_2.6\ H_2O$;
Cancrinite, $3(Na_2O.Al_2O_3.2\ SiO_2).Na_2CO_3$;
Leucite, $K_2O.Al_2O_3.4\ SiO_2$;
Lazurite, $(Na,Ca)_8Al_6Si_6O_2.4.2(S,Cl,So_4)$;
Scaplite, $Na_4Al_3Si_9O_{24}.Cl$;
Mesolite, $Na_2O.Al_2O_3.3\ SiO_2.2-3\ H_2O$;
Ptilolite, $Na_2O.Al_2O_3.10\ SiO_2.4\ H_2O$;
Mordenite, $Na_2O.Al_2O_3.10\ SiO_2.6.6\ H_2O$;
Nepheline, $Na_2O.Al_2O_3.2\ SiO_2$;
Natrolite, $Na_2O.Al_2O_3.3\ SiO_2.2\ H_2O$;
Sodalite, $3(Na_2O.Al_2O_3.2\ SiO_2).2\ NaCl$.

There are essentially two principal parts or steps which, depending on the order of practice, make up the several embodiments of my invention. That is, these two principal parts or steps can be practiced in either order or concurrently.

One principal of the processes of my invention comprises the treating of a crystalline zeolite, or an ion exchange crystalline zeolite with a dilute fluoride solution in one or more contacting steps. The selected zeolite is slurried with a solution containing about 0.02 to 0.22 grams of available fluoride per 100 grams of zeolite (dry dehydrated basis) and having a slurry pH in about the range of 3 to 11. By available fluoride I mean the fluroide which is disassociated and available to combine with the zeolite. Thus, for example, although ammonium fluosilicate has six atoms of fluorine per molecule, four of these atoms will be too strongly attracted to the silicate atom, even in solution, to become available. Typically, the solution will have a fluoride concentration of about 0.1 to 5 g/liter, however, the important limitations are the pH of the slurry and the relative ratio of available fluoride to zeolite. Typically and conveniently, the fluoride solution will be an aqueous solution though other solvents for fluorine salts could be used. Suitable fluorine compounds which can be used include, for example, ammonium fluosilicate, sodium fluosilicate, ammonium fluoride, sodium fluoride, potassium fluosilicate, potassium fluoride and the like. Other fluorine salts could be used, provided they will dissolve in a suitable solvent, preferably water, to yield available fluoride ion. (Especially good results are obtained with ammonium fluosilicate (i.e., $(NH_4)_2SiF_6$). Further, ammonium fluosilicate is particularly desirable salt for industrial application, since it is easily prepared and easily handled.)

A preferred method of fluoride treating the zeolite is the use of multiple contacting steps. In between these steps, the zeolite can be washed, and/or dried, and/or heat treated. By heat treating is meant a heating to a range of about 500° to 1400°C.

The pH of the first treating solution will generally, during contacting, be above 6 when treating a sodium or other alkali zeolite, due in a considerable part to the basicity of the zeolite, while solutions used for subsequent contacting will range lower. The use of multiple contacting steps is useful in that the fluoride concentration of the fluoride solution can be maintained at a lower initial level, but at a higher average level throughout the contacting operation. The use of a high fluoride concentration contacting solution would provide sufficient fluoride to attack the zeolite structure. The pH of the second and third contacting solutions are generally in the range of 5–7, and when the zeolite has a fairly high acid stability, can range as low as about 4. When Zeolite Y is treated, the pH of multiple contactings may very usefully be in the range of 4–5. When the zeolite being treated is an exchanged zeolite, and particularly a rare earth metal, transition metal or other metal ion exchanged zeolite, the pH of the fluoride treating solution may be in the range of as low as 3.5 The exchanged zeolites are generally more stable in acid environments than the alkali ion form. This is well exemplified by any comparison with the stability of the sodium zeolites.

Ambient treating solution temperatures can be used in our process though temperatures both below and above this can also be used such as, for example, are dictated by considerations of the solubility of the fluorine compound and whether its solution is more active in attacking zeolite structure at higher temperatures than at lower temperatures. Conveniently, solution temperatures in the range of about 60° to 130°F can be used. But both higher and lower solution temperatures can also be used. The fluoride solution should be allowed to contact the zeolite for a sufficient time to mix with and diffuse into the zeolite. Typical contact times are about at least 5 minutes and preferably about 15 minutes to 1 hour. Mechanical mixing means can also be desirably used to expedite mixing. The treated zeolite is then removed from the solution by any appropriate means such as, for example, filtration or centrifugation. The treated zeolite may then either be washed, dried, heat treated, and/or be given a second contacting with a fresh fluoride solution. When a second or further contacting is performed, the time duration of each contacting may be decreased. The stabilized zeolite can then be given a mild thermal treatment at a temperature of 200°F to activate (i.e., remove the hydrated water and absorbed water), or it can be activated within the actual adsorption or catalytic unit.

A second principal part of the processes of my invention comprises the ammonium ion, rare earth metal ion or other metal ion exchange of a fluoride treated zeolite, or a zeolite which is to be subsequently fluoride treated. A preferred mode of crystalline zeolite exchange comprises in a first step mixing an excess of the salt solution with the zeolite for a proper period of time, usually 15 minutes to 5 hours. The rate of exchange can be increased by carrying out the exchange at an elevated temperature. Obviously, the exchange temperature of the solution must be below the atmosphere boiling point of the solution, unless pressure equipment is used. Suitable exchange may be carried out at temperatures of from about 20°C to 95°C, and up to about 150°C, using pressure equipment. The excess salt solution is then removed from contact with the zeolite after a suitable period of time, for example, 15 minutes to 5 hours. The time of contact between the cation exchange solution and the zeolite is such as to effectively replace the easily exchangeable cations in the aluminosilicate to about 3 percent, calculated as the oxide of the cation, for example, $Na_2O$.

In the second step, the exchanged zeolite is washed to remove any excess salts. This washing is a conventional step and is normally carried out with deionized or tap water.

After the washing step, the zeolite, now partially exchanged with the cation desired and having 10 to 20 percent of the original cations remaining (depending on the particular zeolite) is dried and heat treated to redistribute the locked in cations. The heat treatment is normally carried out at a temperature of 200° to 1500°F, preferably low enough so as not to cause the zeolite crystalline structure to collapse, since some of the zeolites in the low initial cation condition enter into what is known as a metastable condition, wherein the crystalline structure will collapse when subjected to thermal treatment. The duration of the heat treatment is dependent upon the temperature, e.g., a shorter heat treatment duration will require a higher temperature. Suitable results are obtained when the heat treatment is carried out at a temperature of about 1000°F for periods of 0.10 hour to 3 hours.

In the last step of this exchange process, the zeolite is cooled to room temperature and a final exchange carried out to reduce the initial cation content to the desired level. This final exchange is carried out again using a metal solution having the same properties as the metal ion solution used for the first exchange or using an ammonia solution. The zeolite at this point contains less than about 3 percent by weight of sodium ion (calculated as $Na_2O$). The zeolite is then given a final wash and dried. Prior to actual use, the zeolite may be calcined to activate it by removing the water molecules. Such calcination is conventional and may, for example, be carried out at 700°F for 3 hours.

Another mode of ion exchange of a zeolite, also known as simple exchange, comprises one or more contactings of the zeolite with an ammonium or metal ion solution, preferably an aqueous solution, which contains an excess of the metal ion. The contacting metal ion solution is most conveniently an ammonium or metal salt solution. The zeolite is contacted with the solution for a proper period of time, usually 15 minutes to 5 hours. The temperature of the exchange media is maintained at from about 20°C to 95°C and up to 150°C using pressure equipment. In a preferred embodiment of this mode of exchange, the zeolite is given at least two or more contactings. The alkali metal ion content of such an exchanged zeolite is generally in the range of 3–6 percent calculated as the oxide.

These exchange processes are, of course, capable of modification. For example, the heating (to redistribute the locked in cations), and the ion exchange step may be carried out as a series of repeating cycles. Also the exchange technique may be practiced in part, eliminating one or more of the heat treating or contacting steps.

These two principal steps in combination in either order, of fluoride treating, and exchanging the alkali ions of the zeolite, make up the first and second embodiments of practicing my invention. The first embodiment essentially comprises fluoride treating a crystalline alkali zeolite followed by exchange of at least part of the sodium from the zeolite by an exchange of the zeolite using an ammonium or metal ion solution to sodium ion content of less than about 3 percent. The second embodiment of practicing my invention comprises the reverse order of these steps. That is, the alkali zeolite is first exchanged with an ammonium ion or metal ion solution, followed by a treating with a fluoride solution. In either mode, the zeolite produced has an unwashable fluoride content of 0.01 to 0.15 percent by weight. This results in a fluoride treated zeolite with increased thermal and steam stability and a generally higher surface area.

The third embodiment of my invention comprises the concurrent contacting of the zeolite in the alkali form with the fluoride ion and exchanging ion. In this mode, a co-mixture is formed of an excess of the ammonium, rare earth metal or other metal exchange solution and the dilute fluoride ion solution. As in the prior modes of my invention, the fluoride content of the solution will be in the range so as to provide 2 to 22 grams of available fluoride per 10,000 grams of zeolite. This range is equivalent to 0.02 to 0.22 grams of available fluoride per 100 grams of zeolite. The available fluoride is provided by one of the materials as set out above. The exchange part of the comixture is provided by an ammonium ion, rare earth ion or other metal ion solution. The only factor of significance is forming the co-mixture is that the fluoride salt component and exchange salt component when in solution must be compatible. In other words, there should be no interaction of these materials that would produce a precipitate and thus make unavailable the required fluoride. It has been found generally, however, that the available fluoride yielding salts will be compatible with ammonium ion solutions, rare earth salt solution and transition metal salt solutions, since these metal ions do not usually form insoluble compounds in the co-mixture media. This co-mixture media is most efficiently an aqueous media with concentration, pH and temperature conditions suitable to each specific metal ion in co-mixture. It is only necessary that the fluoride ion and exchange metals have a considerable degree of solubility in aqueous solutions at temperatures of 20° to 100°C. This solubility assures the presence of available fluoride.

The exact stepwise method of conducting this mode of the invention may be by either of two techniques. These techniques parallel those of the simple and preferred ion exchange techniques as set out for the first and second modes for practicing my invention except that the exchange solution must be a compatible co-mixture of the fluoride ion exchange ion solutions. Therefore, the contactings of the zeolite with the co-mixture may be in a series of contactings, with or without interspersed heat treating steps. Further, in between contactings there need not be a washing or drying of the zeolite, however, prior to my heat treating step, the zeolite should be washed. After the last contacting, the zeolite is washed, dried and optionally activated.

The rasulting compositions are crystalline zeolites, exchanged or unexchanged, having an increased thermal stability and containing about from 1 to 15 grams of fluoride per 10,000 grams of zeolite, incorporated within the zeolite. It is critical that the amount of fluoride incorporated within the zeolite be maintained within these limits, since a greater amount of fluoride will actually reduce the thermal stability of the zeolite and in some instances actually cause destruction of the crystal structure. Similarly, if the minimal quantity of fluoride required above is not incorporated into the zeolite, the zeolite will not exhibit any appreciable, if any, increase in thermal stability. The stabilized zeolites of my invention possess a crystallinity retention, in the temperature ranges of intermediate crystalline collapse, of at least 1.15 times that of the untreated zeolite. Typically, this increase in stability ranges from about 1.15 to 3 times that of the untreated zeolite. By temperature ranges of intermediate collapse is meant temperature ranges in which the untreated zeolite experiences loss, some to upwards of 90 percent of its crystallinity. Thus, for example, a commercial sodium cation Zeolite X will have an initial surface area of around 800 m²/g and will start to experience collapse at temperatures of about 1200°F and after calcination for 2 hours at 1400°F the surface area will be reduced to about 500 to 550 m²/g. If the calcination is effected at 1425°F, the surface area will be reduced to around 200 to 250 m²/g, which though representing a substantial loss of surface area, is still considered to represent a substantial amount of surface area. If the zeolite is calcined at 1450°F, the surface area will be reduced to around 15 to 20 m²/g indicating in effect, complete loss of crystallinity. Thus, for a sodium Zeolite X, the temperature range of intermediate crystalline collapse, and in which range the zeolite composition of my invention has increased crystalline thermal stability, would be from about 1250° to 1435°F. Since the various zeolites have different thermal stabilities, the temperature range of intermediate crystalline collapse will vary for the particular type zeolite. Thus, for example, a sodium cation crystalline Zeolite A will start to experience crystalline collapse at temperatures in the range of about 1100° to 1200°F and suffer virtually complete loss of crystallinity at temperatures of about 1400°F. Thus, I have ascertained the intermediate crystalline collapse temperature range for a sodium cation Zeolite A to be about 1250° to 1390°F. It should also be noted that crystallinity for sodium Zeolite A must be measured in terms of X-ray crystallinity, since the pore sizes of this zeolite are too small to permit entrance of the nitrogen molecular and thus preclude conventional surface area measurements which are necessarily based upon the absorption of nitrogen.

EXAMPLE 1

This example illustrates a method according to my invention of increasing the thermal stability of a Z-14 (Type X) sodium zeolite having a 115 percent X-ray crystallinity and 24.92 A cell size designated as Code 540 13 X-Na by the Davison Division of W. R. Grace & Co.

An aqueous ammonium fluosilicate solution containing 2 grams of $(NH_4)_2SiF_6$ per 500 ml. of solution was prepared. 100 grams (dry basis) of 13X-Na zeolite was slurried in 100 ml. of water in a teflon-lined vessel. 50 ml. of the aforementioned ammonium fluosilicate was then added to the slurry with stirring. The slurry was then stirred for 10 minutes at 70°F. The so treated zeolite was then recovered by filtration and dried overnight at a temperature of 200°–230°F. The filter cake was not washed prior to drying.

Additional examples were prepared following the same procedure but using different quantities and concentrations of the ammonium fluosilicate solution. The thermal stability of the resulting samples was then tested at 1400°F and at 1425°F. A summary of these examples appears below in Table I.

Table I

| Sample | A | B | C | D | E | F |
|---|---|---|---|---|---|---|
| Z-14-Na Zeolite (gram D.B.*) | 500 | 500 | 500 | 500 | 500 | 500 |
| Water for Slurrying, ml. | 2000 | 2000 | 2000 | 2000 | 2000 | 2000 |
| $(NH_4)_2SiF_6$ Solution, ml. | 0 | 50 | 100 | 200 | 300 | 500 |
| $(NH_4)_2SiF_6$ concentration of Solution g/l | — | 10 | 10 | 10 | 10 | 10 |
| Grams $(NH_4)_2SiF_6$ | 0 | 0.5 | 1.0 | 2.0 | 3.0 | 5.0 |
| pH of $(NH_4)_2SiF_6$ Solution | — | 4.0 | 4.0 | 4.0 | 4.0 | 4.0 |
| pH of Treated Slurry | 10.4 | 10.2 | 10.0 | 9.6 | 9.3 | 8.7 |
| T.V. at 1000°F, Oven Dried Cake (Wt. percent) | 20.28 | 20.12 | 20.34 | 19.79 | 19.62 | 19.23 |
| Wt. percent F, D.B.* | — | 0.031 | 0.055 | 0.055 | 0.044 | 0.110 | 0.044 |

*Dry Basis

It can be seen from the above table that the thermal stability of the zeolite is increased by using fluoride contents of about from 0.045 to 0.15 percent by weight. In a second part of this example, samples of these materials are rare earth exchanged to $Na_2O$ levels in the range of from less that 0.1 to 3 percent (by weight). The above samples were exchanged using the following procedure.

50 G. dry basis of each sample is slurried in 200 ml. of water. This slurry is blended into a solution containing 50 g. $ReCl_3.6 H_2O$ in 200 ml. of water, refluxed for 1 hour, filtered and washed chloride free. The zeolite is then reslurried into 90 ml. of water, and this slurry blended into a solution of 40 g. of $ReCl_3.6 H_2O$ in 200 ml. of water. This slurry is refluxed for one hour with stirring. The slurry is then vacuum filtered and washed chloride free. This zeolite material is then heat treated (calcined) at 1000°F for 3 hours in a muffle furnace. The calcined zeolite material is cooled to room temperature, mixed with a solution of 40 g. of $(NH_4)_2SO_4$ in 200 ml. of water and refluxed for one hour. The zeolite slurry is then vacuum filtered, washed chloride free and dried. The zeolites are then activated by heating to 1000°F for 1 hour.

Table II sets out the comparative stabilities of these samples.

Table II

| Sample | A | B | C | D | E | F |
|---|---|---|---|---|---|---|
| Surface Area Sq. in./gm | | | | | | |
| 3 hrs. at 1000°F | 695 | 720 | 722 | 705 | 731 | 714 |
| 3 hrs. at 1600°F | 615 | 650 | 632 | 627 | 650 | 642 |

EXAMPLE II

This example illustrates the technique of fluoride treating a rare earth and ammonium exchanged Z-14 zeolite (Type X), and the increase in stability of such an exchanged and heated zeolite.

50 G. dry basis of each sample is slurried in 200 ml. of water. This slurry is blended into a solution containing 50 g. $ReCl_3.6 H_2O$ in 200 ml. of water, refluxed for one hour, filtered and washed chloride free. The zeolite is then reslurried into 90 ml. of water, and this slurry blended into a solution of 40 g. of $ReCl_3.6\ H_2O$ dissolved in 200 ml. of water. This slurry is refluxed for one hour with stirring. The slurry is then vacuum filtered and washed chloride free. This zeolite material is then heat treated (calcined) at 1000°F for 3 hours in a muffle furnace. The calcined zeolite material is cooled to room temperature, mixed with a solution of 40 g. of $(NH_4)_2SO_4$ in 200 ml. of water and refluxed for one hour. The zeolite slurry is then vacuum filtered, washed and dried. The zeolites are then heated at 1000°F for one hour to activate the zeolite. This zeolite product has the following analysis:

| | |
|---|---|
| $Re_2O_3$ (D.B.) | 26.27% |
| $Na_2O$ (D.B.) | 0.30% |
| $SO_4$ (D.B.) | 0.24% |
| $Al_2O_3 + SiO_2$ (D.B.) | remainder |

After activation, this zeolite has a surface area of 676 m²/g and an X-ray peak height of 87 mm.

Three samples of such an exchanged zeolite were treated with $(NH_4)_2SiF_6$ as set out in Table III. The technique consists essentially of preparing an aqueous solution of $(NH_4)_2SiF_6$ per liter. 100 G. of the exchanged zeolite is slurried with 2000 g. of water and mixed with proportions of this solutions as set out in Table III. The treatment is for 10 minutes at room temperature. The so treated zeolite was then recovered by filtration and dried overnight at a temperature of 200°–300°F.

Table III

| | 1 | 2 | 3 |
|---|---|---|---|
| NH₄ CREX (gms. D.B.) | 100 | 100 | 100 |
| Slurry H₂O (ml.) | 2000 | 2000 | 2000 |
| Slurry Temp. (°F) | 88 | 88 | 88 |
| Slurry pH | 7.3 | 9.6* | 7.3 |
| (*Ammonia added) | | | |
| (NH₄)SiF₆ Solution (ml.) | — | 125 | 250 |
| Slurry Mix pH | 7.3 | 9.3 | 7.3 |
| Fluoride (% D.B.) | — | 0.033 | 0.061 |
| Dried Filter Cake | | | |
| After Act. 1 hour | | | |

Table III-continued

| | 1 | 2 | 3 |
|---|---|---|---|
| at 1600°F — Peak Height (mm) | 71 | 71 | 71 |
| at 1650°F — Peak Height (mm) | 49 | 49 | 38 |
| at 1675°F — Peak Height (mm) | 0 | 38 | 0 |
| at 1600°F — Surface Area | 626 | 633 | 627 |
| at 1650°F — Surface Area | 489 | 525 | 437 |
| at 1675°F — Surface Area | 0 | 402 | 0 |

As is evident from Table III, the fluoride treating increases the stability, however, the percent fluoride should be in the range of about 0.03 percent by weight.

EXAMPLE III

This example illustrates the embodiment of a concurrent exchange and fluoride treating of a zeolite Y. The zeolite in this example is a Sodium Zeolite Y.

The technique consists of slurrying 200 g. samples of the sodium zeolite with 500 ml. of water. This slurry is first exchanged with a solution mixture of 200 g. of $(NH_4)_2SO_4$ in 1000 g. of water, varying amounts of an $(NH_4)_2SiF_6$ solution containing 10 g. of $(NH_4)_2SiF_6$ per 1000 g. of water. Table IV sets out the amount of $(NH_4)_2SiF_6$ in each treating solution. These zeolite containing mixtures are heated to 120°F for 15 minutes to effect fluoriding and exchange. The zeolites are then filtered and washed. These zeolites are then given a second exchange and fluoriding by slurrying each zeolite in 225 ml. of water and adding this slurry to a solution mixture of 200 g. of $(NH_4)_2SO_4$ in 1500 g. of water and a varying amount of an $(NH_4)_2SiF_6$ solution (10 g/1000 ml). This zeolite mixture is heated at 120°F for 15 minutes to affect exchange, filtered, washed and dried. After drying, each zeolite sample was activated by heating at 600°F for 2 hours. These activated samples were then slurried with 1250–1500 g. of water and slurried with 150 ml. of a $ReCl_3.6\ H_2O$. This slurry is heated at 160°F for 15 minutes to effect exchange. These exchanged slurries were filtered, washed chloride free, dried and activated by heating at 1000°F for 2 hours. The results are set out in Table IV.

Table IV

| Run No. | 0 | 1 | 2 | 3 | 4 |
|---|---|---|---|---|---|
| Zeolite Y, g, (D.B.) | 200 | 200 | 200 | 200 | 200 |
| pH, slurried in | | | | | |
| 500 ml. H₂O | 10.2 | 10.1 | 10.2 | 10.2 | 10.2 |
| 1st Exchange | | | | | |
| (NH₄)₂SO₄, g | 200 | 200 | 200 | 200 | 200 |
| H₂O, ml | 1000 | 1000 | 1000 | 1000 | 1000 |
| (NH₄)₂SiF₆, g. | 0 | 0.1 | 0.2 | 0.3 | 0.4 |
| Exchange Slurry, pH | | | | | |
| Start 120°F | 7.2 | 6.9 | 6.9 | 6.5 | 6.7 |
| After 15 min. at 120°F | 7.2 | 6.5 | 6.3 | 5.9 | 5.9 |
| 2nd Exchange | | | | | |
| (NH₄)₂SO₄, g | 200 | 200 | 200 | 200 | 200 |
| H₂O, ml | 1500 | 1500 | 1500 | 1500 | 1500 |
| (NH₄)₂SiF₆, g | 0 | 0.1 | 0.2 | 0.3 | 0.4 |
| Exchange Slurry, pH | | | | | |
| Start 120°F | 6.9 | 6.1 | 6.0 | 5.6 | 5.5 |
| After 15 min. at 120°F | 6.9 | 5.8 | 5.7 | 5.4 | 5.2 |
| Product | | | | | |
| Na₂O, % (D.B.) | 3.42 | 3.41 | 3.46 | 3.35 | 3.41 |
| Heat Treatment | | | | | |
| 2 hours at | 600°F | 600°F | 600°F | 600°F | 600°F |
| 3rd Exchange | | | | | |
| Activated Samples, g | 121.5 | 127.5 | 153.8 | 149.5 | 146.5 |
| H₂O (to slurry) ml | 1250 | 1250 | 1500 | 1500 | 1500 |
| Slurry, pH | 4.5 | 3.9 | 4.0 | — | 3.5 |
| ReCl₃.6 H₂O, g | 6.3 | 6.3 | 7.4 | 7.4 | 7.4 |
| H₂O, ml | 150 | 150 | 150 | 150 | 150 |
| ReCl₃ solution, pH | 4.9 | 4.4 | 4.3 | 4.5 | 4.9 |
| Exchanged slurry pH | 3.3 | 3.3 | 3.3 | 3.0 | 3.0 |
| Re₂O₃, % (D.B.) | 1.84 | 1.88 | 1.99 | 1.75 | 1.56 |
| Na₂O, % (D.B.) | 0.54 | 0.52 | 0.44 | 0.46 | 0.56 |

Table IV-continued

| Run No. | 0 | 1 | 2 | 3 | 4 |
|---|---|---|---|---|---|
| T.V. % | 13.14 | 11.63 | 11.51 | 11.62 | 12.40 |
| Surface Area | | | | | |
| 3 Hrs. at 1000°F, M²/g | 519 | 571 | 599 | 597 | 597 |
| 3 Hrs. at 1600°F, M²/g | 327 | 350 | 422 | 517 | 416 |
| Surface Area Improvement | | | | | |
| % of Non-Treat Sample | | | | | |
| 3 Hrs. at 1000°F | 100 | 110 | 115 | 115 | 115 |
| 3 Hrs. at 1600°F | 100 | 107 | 129 | 158 | 127 |
| M.A. at 1050°F at | | | | | |
| 60 PSIG Steam | | | | | |
| % Conversion | 83.3 | 85.8 | 91.9 | 88.6 | 90.2 |
| Reference % Conversion | 85.7 | 86.4 | 86.4 | 86.4 | 85.7 |
| % Conversion | | | | | |
| % Reference | 97% | 99% | 106% | 102% | 105% |
| M.A. at 1070°F at | | | | | |
| 90 PSIG Steam | | | | | |
| % Conversion | 75.9 | 78.7 | 83.6 | 84.1 | 83.1 |
| Reference % Conversion | 84.4 | 83.3 | 83.3 | 83.3 | 84.4 |
| % Conversion | | | | | |
| % Reference | 90% | 94% | 100% | 101% | 98% |

From the tabulated results in Table IV, it is evident that the fluoriding increases both the thermal and steam stability as well as increasing the conversion. Conversion is the ability of the zeolite to produce gasolines. The procedure for determining conversion is the Microactivity Test is set out on pages 88–93 of the Oct. 16, 1967 issue of the Oil and Gas Journal.

EXAMPLE IV

This example further illustrates the embodiment of a concurrent exchange and fluoride treating of a zeolite. The zeolite in this example is a Sodium Zeolite Y.

200 G. of Sodium Zeolite Y is slurried with 500 ml. of water. This zeolite slurry is first concurrently exchanged and fluorided with a solution mixture containing 200 g. of $ReCl_3 \cdot 6 H_2O$ and 0.3 g. of $(NH_4)_2SiF_6$ in 1300 g. of water. This slurry mixture is heated at 120°F for 15 minutes, filtered and washed. The zeolite is then reslurried with 400 ml. of water and contacted with a fresh portion of the above rare earth chloride - ammonium fluosilicate solution and heated again at 120°F for 15 minutes. The zeolite slurry mixture is then filtered, washed chloride free, and dried. After drying, the zeolite is heat treated at 600°F for 2 hours. The next step is a rare earth exchange with a solution 200 g. of $ReCl_3 \cdot 6 H_2O$ dissolved in 1000 g. of water. The zeolite is added to this solution and the mixture is heated at 120°F for 15 minutes. The zeolite is then vacuum filtered, washed chloride free and activated by heating to 600°F for 2 hours.

The sodium ion content (calculated as $Na_2O$) is 1.2 percent by weight. The microactivity Test conversion value for this catalyst at 1050°F and 60 PSIG steam is 89.1 percent.

What is claimed is:

1. A method of producing highly stable fluorided crystalline aluminosilicate zeolites comprising:
    a. contacting at least once a crystalline aluminosilicate zeolite in the alkali metal form with a sufficient quantity of a solution of a soluble fluorine compound which in solution yields available fluoride ions to provide from about 2 to 22 grams of available fluoride per 10,000 grams (dry basis) of zeolite, and a slurry pH of about 3 to 11 for a sufficient length of time to allow said solution to thoroughly contact and diffuse into said zeolite;
    b. separating and washing the fluoride treated crystalline aluminosilicate zeolite;
    c. exchanging the alkali ions in said fluoride treated crystalline aluminosilicate zeolite with an aqueous solution selected from the group consisting of ammonium salt solutions, rare earth salt solutions, alkaline earth salt solutions and transition metal salt solutions and mixtures thereof, to a final alkali content of less than about 6 percent by weight calculated as the alkali oxide; and
    d. recovering said highly stable crystalline aluminosilicate zeolite.

2. A method as in claim 1 wherein said contacting with a soluble fluorine compound is at 60° to 130°F.

3. A method as in claim 1 wherein said soluble flourine compound is selected from the group consisting of ammonium fluosilicate, fluosilicic acid, sodium fluosilicate, ammonium fluoride, sodium fluoride, potassium fluoride and mixtures thereof.

4. A method as in claim 1 wherein in step (c) there are multiple contacting steps for exchanging said alkali ions.

5. A method as in claim 4 wherein interspersed between at least two of said contacting steps is a heat treating of said zeolite at about 200° to 1500°F.

6. A method as in claim 1 wherein said exchanging comprises contacting said fluoride treated crystalline aluminosilicate zeolite with an aqueous salt solution containing an excess of the exchanging ions required to replace zeolite alkali ions for a period of from 15 minutes to 5 hours at a temperature of about 25° to 95°C.

7. A method as in claim 6 wherein there are multiple contacting steps in step (c) with at least one step of washing and heat treating of said zeolite at about 200° to 1500°F. interspersed between at least two of the contacting steps.

8. A method as in claim 7 wherein said aqueous salt solution is selected from the group consisting of ammonium salt solutions and rare earth metal salt solutions.

9. A method as in claim 7 wherein said aqueous salt solution is a transition metal salt solution.

10. A method of producing highly stable fluorided crystalline aluminosilicate zeolites comprising:
    a. forming an admixture of a soluble fluorine compound in an amount which in solution is capable of yielding from about 2 to 22 grams of available fluoride per 10,000 gm. of zeolite and a compatible salt of a cation selected from the group consisting of ammonium, rare earth metals, transition metals and mixtures thereof;

b. contacting a crystalline aluminosilicate zeolite in the alkali metal form at least once with said admixture to form a slurry having a pH of about 3 to 11 whereby said zeolite is concurrently fluorided and exchanged; and c. washing and drying said zeolite.

11. A method as in claim 10 wherein said soluble fluorine compound is selected from the group consisting of ammonium fluosilicate, fluosilicic acid, sodium fluosilicate, ammonium fluoride, sodium fluoride, potassium fluosilicate, potassium fluoride and mixtures thereof.

12. A method as in claim 10 wherein said zeolite is selected from the group consisting of Zeolite X and Zeolite Y.

13. A method as in claim 10 wherein there are multiple contactings of said zeolite with said admixture, each contacting being for 15 minutes to 5 hours.

14. A method as in claim 13 wherein said contacting is at a temperature of 25° to 95°C, the pH of said admixture being about 3 to 11.

15. A method as in claim 14 wherein between at least one contacting step and another, said zeolite is washed and calcined at about 200° to 1500°F.

* * * * *